United States Patent [19]

Fey

[11] Patent Number: 4,802,919
[45] Date of Patent: Feb. 7, 1989

[54] METHOD FOR PROCESSING OXIDIC MATERIALS IN METALLURGICAL WASTE

[75] Inventor: Maurice G. Fey, Plum Borough, Pa.
[73] Assignee: Westinghouse Electric Corp., Pittsburgh, Pa.
[21] Appl. No.: 69,570
[22] Filed: Jul. 6, 1987
[51] Int. Cl.$^4$ .......................... C21B 3/04; C22B 7/02
[52] U.S. Cl. ............................................................. 75/25
[58] Field of Search ............................................... 75/25

[56] References Cited

U.S. PATENT DOCUMENTS

| | | | |
|---|---|---|---|
| 723,105 | 3/1903 | Williams | 75/25 |
| 2,461,697 | 2/1949 | Queneau | 266/148 |
| 3,262,771 | 7/1966 | Ban | 75/25 |
| 3,770,416 | 11/1973 | Goksel | 75/25 |
| 4,042,379 | 8/1977 | Harris et al. | 75/88 |
| 4,372,780 | 2/1983 | Madelin | 75/25 |
| 4,488,905 | 12/1984 | Santen | 75/25 |
| 4,525,208 | 6/1985 | Yasukawa et al. | 75/88 |
| 4,548,621 | 10/1985 | Eriksson et al. | 75/88 |
| 4,612,041 | 9/1986 | Matsuoka et al. | 75/25 |
| 4,687,513 | 8/1987 | Santen et al. | 75/88 |

FOREIGN PATENT DOCUMENTS

| | | | |
|---|---|---|---|
| 0046146 | 2/1982 | European Pat. Off. | 75/25 |
| 3427631 | 2/1985 | Fed. Rep. of Germany | 75/25 |
| 0024926 | 2/1980 | Japan | 75/25 |
| 6105439 | 8/1981 | Japan | 75/25 |
| 0153848 | 9/1984 | Japan | 75/25 |
| 0128228 | 7/1985 | Japan | 75/25 |

Primary Examiner—L. Dewayne Rutledge
Assistant Examiner—David Schumaker
Attorney, Agent, or Firm—L. P. Johns

[57] ABSTRACT

A method for processing metallurgical waste characterized by collecting metallurgical waste containing oxides of such metals as lead and zinc which when reduced form volatile and non-volatile metals; compacting a mixture of metallurgical waste, carbonaceous material and silica into pellets; heating the pellet at a temperature sufficient to reduce the oxides to vapors of elemental metals; and condensing the vapors to liquid or solid status of the elemental metal.

13 Claims, 2 Drawing Sheets

METHOD FOR PROCESSING OXIDIC MATERIALS IN METALLURGICAL WASTE

BACKGROUND OF THE INVENTION

1. Field of the Invention

This invention relates to a method for processing metallurgical waste and, more particularly, it pertains to a method for recovering such elemental metals as lead and zinc from smoke and fumes incurred during the refining of a metal such as steel.

2. Description of Prior Art

America's steel industry now produces 33% of its 87,300,000 tons per year output using electric arc furnaces which remelt steel scrap and which have traditionally been referred to as mini-mills, furnishing low and medium cost hot rolled bar mill products to local markets. Unit capacities have increased as has product quality over the past two decades. The mini-mill may now produce more than one million tons of steel annually. Its output must conform to tightly controlled product specifications, and its products are now sold in broad markets.

Electric furnace based steelmaking facilities represent modest capital investment and operating costs when compared to blast furnace basic oxygen furnace operations, but generate large quantities of dusts and fumes. About 500,000 tons of electric arc furnace (EAF) dusts are produced annually in the U.S. These dusts contain undesirable elements which require listing by the Environmental Protection Agency (EPA) as Hazardous Materials in accordance with the Resource Conservation and Recovery Act (RCRA) of 1976. Dusts emanating from a typical electric furnace producing conventional carbon or low alloy steel currently contain up to 35% zinc, up to 4% lead, and may vary from 20% up to 80% iron. Arc furnace dust must now be managed in accordance with a strict set of Federal (and in many cases State) regulations which no longer permit disposal in simple landfills, thus imposing substantial added constraints and costs upon arc furnace producers.

The steel industry has gradually increased its use of the electric arc furnace for primary hot metal production as marginal blast furnace complexes continue to be phased out. Since 1975, arc furnace production has increased from 23 million tons per year (19%) to 29 million tons (33%) in 1985 and this trend is expected to continue for the foreseeable future. Increased use of galvanized steels has tended to increase the zinc content and this trend is also expected to continue to increase as auto producers and other manufacturers move increasingly to longer life, corrosion resistant products.

Extremely fine dusts, with particle sizes ranging from 0.1 to 1.0 microns, are formed by metal vaporization in the electric arc furnace and subsequent reaction with entrained oxygen in the furnace and air pollution control system. The initial vaporization occurs at the ultrahigh temperature arcing zone, due to boiling in the molten bath as the melt is being refined, and because the coating materials on the charge scrap, i.e. zinc, lead, and cadmium, are highly volatile at the temperature of molten steel. Due to the conditions at their formation, individual dust particles tend to be complex multicomponent metal oxides. As such, they have been listed by the EPA as hazardous wastes due to the leachability of such contained toxic tramp elements as lead, cadmium, and chromium. However, they do not lend themselves to conventional processing techniques which would render these dusts delistable.

As hazardous wastes, arc furnace dusts may no longer be disposed of in conventional landfills after simple wetting to prevent wind dispersal. Recent RCRA amendments have imposed increasingly restrictive controls on disposal. In 1984, the EPA required disposal of EAF dusts in secured sites, retrofitted with double liners and systems for collection and removal of leachates. More recently, regulations have banned open landfill disposal altogether, requiring containerization with attendant costs which could considerably exceed $100 per ton.

Rapidly escalating constraints and disposal costs have prompted a number of technology development efforts aimed at treatment of the arc furnace dusts so that they may be delisted and disposed of in a conventional manner. Efforts are underway to develop regional as well as on site dust processing systems, and range from chemical leachant systems for removal of toxic elements to reinjection of dusts into arc furnaces for the purpose of increasing zinc, lead and cadmium concentrations to levels acceptable as feedstocks for established non-ferrous metal producers.

Electric arc furnace baghouse dusts are oxidic in nature and contain the following ranges of composition:

| | |
|---|---|
| Iron Oxides | 45.–89.% |
| Manganese Oxide | 3.–6.% |
| Silicon Oxide | 3.–0.9% |
| Chromium Oxide | 0.1–0.9% |
| Nickel Oxide | 0–0.2% |
| Carbon | 0–0.4% |
| Copper Oxide | 0–0.4% |
| Zinc Oxide | 13.9–33.5% |
| Lead Oxide | 1.2–4.1% |
| Cadmium Oxide | 0–0.2% |
| Tin Oxide | 0–0.1% |
| Magnesium Oxide | 1.–7.% |
| Calcium Oxide | 2.6–14.% |
| Aluminum Oxide | 0.2–0.7% |
| Alkali Salts & Sulfates | 1.7–7.8% |

A number of carbothermic reduction systems have been investigated and proposed for operation typically at temperatures of 2600°–3000° F. Given sufficient carbon and mixing; reduction of the non-slag forming oxides proceeds rapidly providing a metallic melt consisting of iron, manganese, nickel, copper and equilibrium fractions of silicon and chromium. Many of the non-ferrous metals are in the vapor state at the operating temperature. These include zinc, lead and small amounts of cadmium; they may be condensed and collected as liquid metals for separately casting into ingots. (Zinc and lead have less than 1% mutual solubility). The slag formers - oxides of calcium, aluminum, chromium, magnesium and silicon, as well as the alkali and sulfate salts form as a liquidus slag on the melt which may be tapped conventionally. Depending on its chrome concentration and structure, the slag can be delisted and granulated for highway construction.

The advantage of the systems briefly outlined above lies in their ability to produce high valued metallic products (zinc, lead, and the ferrous melt) while at the same time solving a serious national disposal problem. Such systems are segregated into on site and regional processing facilities. The on site system is particularly desirable as it allows the steelmaker to "control his own destiny" with regard to disposal, while at the same time saving a large transportation and disposal fee (now projected to exceed $100 per ton). Such small on site systems suffer, however, from high unit costs owing to their generally small size. A typical 400,000 ton per year mini-mill would produce about 25 to 30 pounds of dust per ton of steel or 5,000 to 6,000 tons of dust annually. Regional facilities, handling 50,000 to 100,000 tons per year have also been proposed and one has been built in Sweden. These larger units offer the advantage of lower unit costs but require transportation charges for supply of the dust.

All the above units employ plasma systems to provide the required energy. Such systems are characterized by utilization of an electric arc discharge for either direct heating of the dust and carbon source or heating of a carrier gas which is in turn used for heat transfer to the reactants. Plasma systems have the advantage of very high temperature operation providing extremely rapid heat transfer while at the same time providing the capability to super heat a highly reducing gas stream for efficient process chemistry.

The drawbacks to plasma systems, however, are expensive power supplies (owing to the negative impedance characteristics of plasmas) and the inherent requirement to handle large volumes of gas within the system. This generally involves recycling the gas to the plasma torch. Large scrubbers, driers, compressors, piping and flow components—are therefore required, entailing major capital, operating and maintenance expenses for the system manager.

A low capital cost system is required into which dust, carbon, and energy can be supplied and steel, nonferrous metals, slag and a fuel gas can be produced with no requirement for troublesome and expensive recirculation, and which can operate controllably using low cost power supplies. The latter requirement could be satisfied by a system having a positive impedance load characteristic.

A typical EAF dust generated during production of carbon steel, has the following analysis * (when adjusted to oxidic constituents):

| | |
|---|---|
| $Al_2O_3$ | 0.37% (by weight) |
| $CaCl_2$ | 1.57 |
| $CaF_2$ | 1.85 |
| $CaO$ | 4.80 |
| $CsSO_4$ | 1.53 |
| $CdO$ | 0.03 |
| $Cr_2O_z$ | 0.56 |
| $CuO$ | 0.21 |
| $Fe_2O_3$ | 2.43 |
| $Fe_3O_4$ | 48.51 |
| $MgO$ | 6.73 |
| $MnO$ | 3.87 |
| $Na_2O$ | 0.83 |
| $NiO$ | 0.09 |
| $PbO$ | 1.62 |
| $SiO_2$ | 5.30 |
| $SnO$ | 0.07 |
| $ZnO$ | 19.17 |
| $C$ | 0.44 |

*Excerpted from "Electric Arc Furnace Dust", D. R. MacRae Center for Metals Production Report 85-2, May 1985

This dust can be reacted with a carbon source such as coke breeze or preferably bituminous coal in a plasma fired furnace, such as the Mesabi Metal Reactor (described in U.S. Pat. No. 4,571,259), and the coke filled shaft furnace, (described in U.S. Pat. No. 4,530,101). While requirements may vary slightly among the several above-referenced systems, all will produce a melt, slag and non-ferrous metal vapor having the following expected compositions:

| Melt | | Non-Ferrous | |
|---|---|---|---|
| Chromium | 0.9% (weight) | Cadmium | 0.2% (weight) |
| Copper | 0.4 | Lead | 8.9 |
| Manganese | 7.2 | Zinc | 90.9 |
| Nickel | 0.2 | | |
| Tin | 0.1 | | |
| Carbon | 0.5 (may be 3.0–4.5) | | |
| Iron | balance | | |

| Slag | |
|---|---|
| Alumina | 1.5% (weight) |
| Calcium Chloride | 6.3* |
| Calcium Fluoride | 7.4* |
| Calcia | 19.3 |
| Calcium Sulfate | 6.1 |
| Magnesia | 27.0 |
| Sodium Oxide | 3.3* |
| Silica | 29.1** |

The approximate material balance is:

| | | | |
|---|---|---|---|
| Input | Dust | 1000. | lbs |
| | Silica | 39. | lbs |
| | Bituminous Coal | 235. | lbs |
| Products | Melt | 372. | lbs |
| | Slag | 385. | lbs |
| | Zinc | 146. | lbs |
| | Lead | 15. | lbs |
| | Gas (75% CO;25% $H_2$) | 315. | lbs |

*For analysis purposes, all Chlorine & Fluorine are shown to report to Calcium. In practice, they will also report to Sodium & Magnesium in equilibrium amounts.
**Silica is added to adjust the basicity ratio of the slag.

The theoretical energy requirements for providing sensible heat and reaction energy to provide products at a temperature of 1900° K. (2960° F.) is 654. kwhr per 1000 pounds of dust (1308 kwhr/ton).

In all three plasma fired systems described above, off gas would be recycled to the plasma torches and superheated to an enthalpy of about 5 kwhr/Nm³. Such torches operate at an efficiency of about 80%. The enthalpy of the above gas mixture (75% CO/25% Hz) at the specified 1900° K. is 0.64 kwhr per Nm³. Assuming no furnace losses, the energy requirement for the system described above is $$\frac{654 \text{ kwh}}{1000 \text{ lbs. dust}} \times \frac{1}{0.80} \times \frac{(5.0 \text{ Kwh/Nm}^3)}{(5.0 \text{ Kwh/Nm}^3 - 0.64 \text{ Kwh/Nm}^3)}$$

This estimate compares very well with the reported value for the SKF system of 1890 kwhr/ton (MacRae). From an energy consumption standpoint, it would be highly desirable to develop a system which avoids the gas recycle and simultaneously operates at increased heating efficiency, thus approaching an energy requirement of 1308 kwhr per ton, rather than 1875 kwhr/ton.

SUMMARY OF THE INVENTION

The method of this invention includes the steps of:
(a) operating a metallurgical furnace resulting in the production of metallurgical fumes and dust containing oxides of metals which when reduced form volatile and non-volatile elemental metals;
(b) compacting a mixture of the dust, carbonaceous material, and silica into pellets;
(c) injecting the pellets into a reducing furnace containing a metal bath and a reacting slag to cause the slag to reduce the dust into vapors of volatile metals including lead and zinc and into non-volatile metals;

(d) venting the vapors of volatile metals from the furnace;

(e) directing the vapors through an inlet into a condenser for condensing the volatile metals into liquid metal melt including a layer of elemental lead and a layer of elemental zinc; and (f) recirculating the liquid lead to a location near the inlet and above the melt and spraying droplets of the liquid lead into the vapor of volatile metal to cause the volatile metal vapor to condense onto the surfaces of The method of this invention is performed in apparatus disclosed in FIGS. 1 and 2, which are schematic views of two embodiments of the invention.

DESCRIPTION OF THE PREFERRED EMBODIMENT

Figure 1:
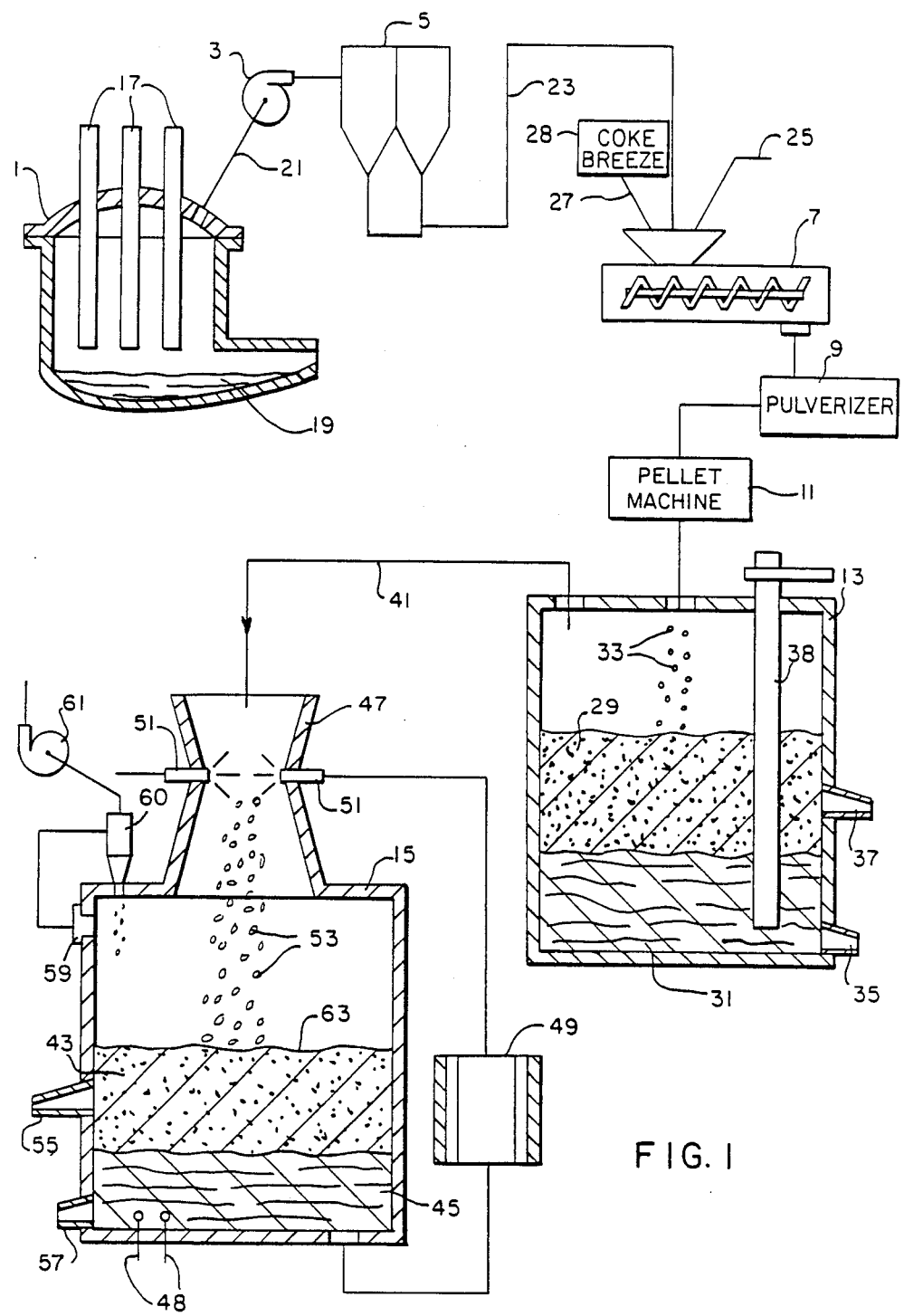
Figure 2:
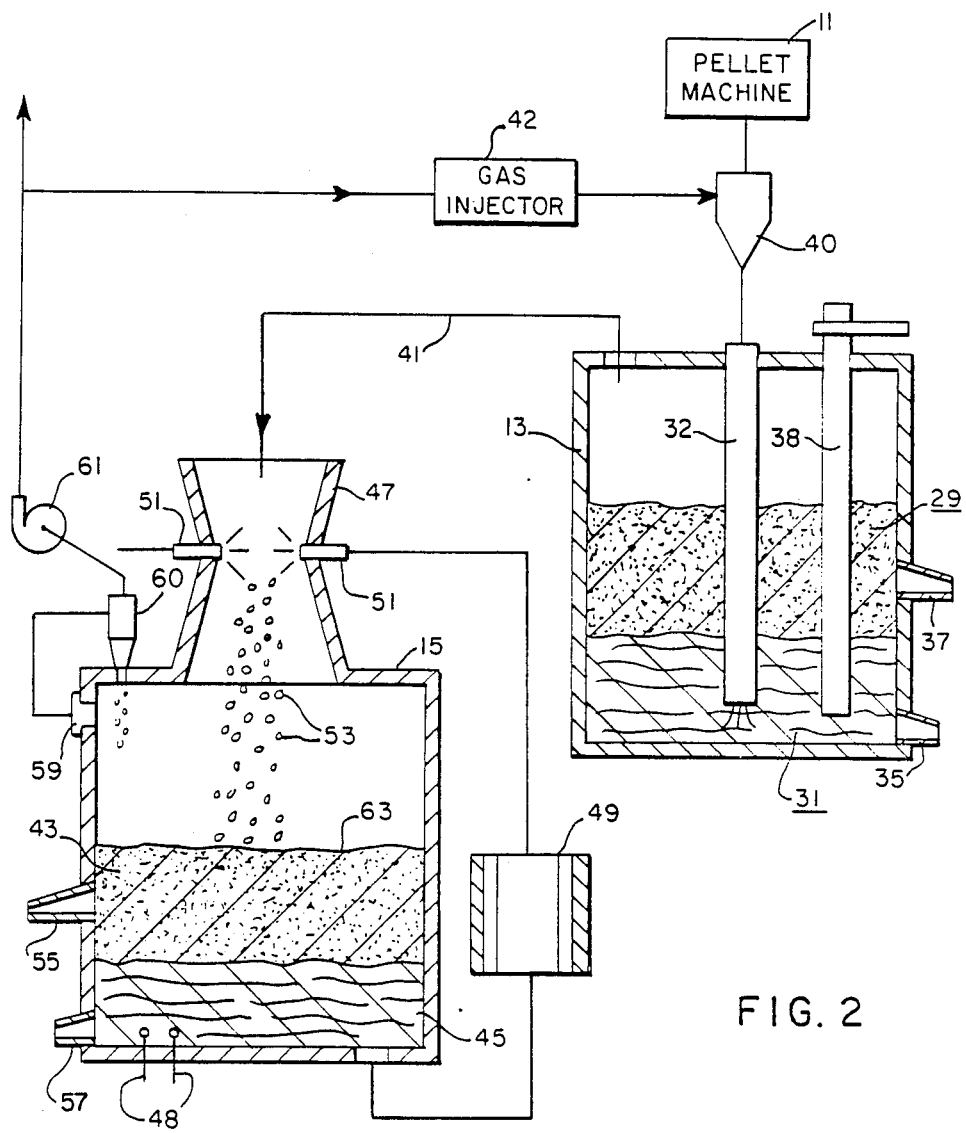

The proposed method for processing metallurgical waste, such as fumes and dust, is generally disclosed in FIGS. 1 and 2. An electric arc furnace 1 is a typical source of such fumes and dust which are vented with the aid of a blower 3 to a baghouse 5 where the dust is collected. From the baghouse the dust is extracted as needed and moved through a blender 7, a pulverizer 9, and a pellet machine 11 to a heating means 13 where the metal oxides of the dust are reduced to elemental metal. Metals which are volatile at the temperature of operation of the heating means 13 are vented from the means as vapor and introduced into a condenser 15 where the metal vapors are condensed to liquid and collected.

More particularly, the electric arc furnace 1 may be a means for refining steel in which graphite electrodes 17 are disposed above a melt 19 of steel. Any dust or fumes generated in the furnace 1 are vented at 21 through the blower 3 to the baghouse 5 where the dust is collected and stored for subsequent processing.

When needed, the dust is conducted via conduit 23 into the blender 7 where it is thoroughly mixed with a slag producing ingredient, such as sand ($SiO_2$) 25, and a carbonaceous material 27 such as coal or coke breeze 28.

The pulverizer 9 reduces the ingredients, dust 23, sand 25, and carbon 27 to minute particle size for better homogenization of the ingredients prior to their compaction in the pellet machine 11. For best results in the subsequent step of reduction of the oxides, the pellet size ranges from about 1 mm to 20 mm.

The heating means 13 is necessary to provide the energy required for sensible heat, melting and for reducing the oxides in the pelletized mixture of dust 23, sand 25, and carbon 27. A well stirred slag bath disposed above a melt 31 is provided as an excellent medium for rapid melting and reaction of the dust oxides with the carbon. Pellets 33 drop into the reacting slag bath 29 causing gas bubbles to evolve during the reaction process (coal decomposition/hydrogen evolution), thereby providing a good mixture of the carbon and oxidic bath constituents. Non-volatile metals, such as iron, chromium carbon, and manganese, settle into and form the melt 31 which is tapped from time to time at 35. Similarly, the slag bath 29 is periodically drained from the furnace 13 through a tap hole 37.

Alternatively, as shown in FIG. 2, the pellets 33 may be conveyed into the reacting melt 31, by way of an insulated lance 32 which is submerged through the slag bath 29. A small quantity of either inert, reducing, or recirculated off gas is used to convey the pellets 33 and keep the lance open. Upon contact with the metal 31, the pellets 33 are rapidly heated and reacted as described above.

Gases evolving from the reacting slag bath 29 are comprised of off gas and vapors of volatile metals, such as elemental cadmium, lead, and zinc, which are conducted via conduit 41 to the upper end of the condenser 15. The condenser provides a housing for a liquid metal melt which may include one or more separate layers 43, 45. For example, the layer of liquid metal 43 may be elemental zinc having an atomic weight which is less than that of, and immiscible with elemental lead of layer 45.

The upper end of the condenser 15 includes a tubular inlet 47 through which the volatile metal vapors flow as they enter the condenser. The tubular inlet 47 is a venturi-like passage to provide optimum mixing of the vapors and liquid metal droplets and thus increase the efficiency of condensation.

To facilitate condensation of the metal vapors as it passes through the the tubular inlet 47, liquid metal lead 45 is circulated in a suitable manner, such as through an electromagnetic pump 49, to spray nozzles 51 disposed around the tube and preferably at the neck of the venturi-like inlet 47. As the lead enters the tube 47 in the form of droplets 53, the metal vapors, such as lead and zinc, deposit upon and condense on the lead droplets on their downward movement to the layer 43. The heavier lead droplets continue downward movement through the zinc layer 43 to the lead layer 45 and yield the condensed zinc surface portions to the zinc layer 43. As the volume of the layers 43 and 45 increase, they are removed through respective tap holes 55, 57.

To expedite condensation of the zinc and lead vapors on the droplets 53, the lead layer 45 is retained at a temperature slightly above the melting point of zinc (420° C.) by a coolant coil 48. A coolant is circulated through the coil in the lead bath to remove heat of vaporization of lead and zinc and maintain the bath at a temperature slightly above the melting point of zinc (420° C.)..

As the off gases enter the condenser 15, they are withdrawn through a vent 59 and into a cyclone 60 where any entrapped zinc or lead droplets are separated in the cyclone from the off gases and returned at 60 to the condenser chamber. The off gases, such as carbon monoxide and hydrogen, are withdrawn through a blower 61.

The heating means 13 may be one of several means for direct bath heating; One means includes electrode means 38. Other direct bath heating means may include radiation heating from heating elements above the bath, submerged arc heating, such as Soderberg electrodes, resistance heating using the conductance of molten slag bath for Joule heating, coreless induction heating, channel induction heating, and transferred arc plasma heating which employs little or no gas flow. The method of submerged arc heating employing Soderberg electrodes is used on a world basis for production of ferro alloys and such specialities as phosphorous and metallurgical grade silicon. The Joule heated resistance bath method is one of the principal melting techniques employed by the glass industry.

Coreless induction and channel induction heating are broadly used by the foundry industry for primary melting of gray iron and non-ferrous metals. Assuming that the problem of fluxing (erosion) of furnace linings is neutralized by selection of proper lining materials, the use of a coreless induction melter is particularly attractive as it provides very strong recirculation of the molten bath which is a strong plus for a reacting (carbon & dust) system.

All of the above systems can be designed for good thermal efficiency, have no large recirculating gas flows, and thus can approach the energy requirement of 1308 kwhr/ton of dust, assuming that the system provides high yields of the predicted products. Good yield is a function of appropriate preparation, injection, and mixing of the input dust and reductant. The carbon source may be coke breeze, coal, or a mixture of the two. It is important that the carbon source be ground to as small a particle size as practical and intimately mixed with the dust. This may be accomplished by co-grinding the two materials in a ball mill or high intensity jet mill. The latter is reported to be capable of providing particle sizes on the order of 1 to 10 microns. Grinding the coal (carbon) in the presence of the dust will have the effect of providing a virtually homogenous mixture of the two constituents.

Following grinding, the feed material is then pelletized to enable handling without a serious dust problem. The pellets are formed by simple compaction. The pellets 33 are then gravity fed through the top of the furnace 13 and dropped into the bath 29. Particle size is important in that the pellets must be heavy enough to drop below the surface of the bath 29, but small enough to melt as rapidly as possible. Once contained within the bath 29, the oxide constituents in the dust combine with the carbon. The carbon monoxide product gas, as well as a metalic zinc, lead, and cadmium vapors along with any hydrogen will bubble out of the slag and be vented from the top of the furnace 13 into an adjacent non-ferrous metal spray condenser 15. The melt constituents will gravity separate from any slag layer 63 and coalesce into the metal bath 43 below the slag layer.

The rate of reaction will be governed by the carbon particle size, the fluidity of the slag, and the degree of slag motion. The carbon particle size should be the minimum possible in order to maximize the exposed reacting surface area. The slag should be as fluid as possible and also be well stirred in order to maximize the mixing between reactants. The fluidity will help to control the amount of slag foaming.

In practice, the proposed dust processing system is operated on a semi-batch basis; a substantial "heel" will be required in order to provide rapid dispersion of the input feed materials into the bath. After charging, the materials in the slag layer must be allowed to react until the slag foaming dies down, when the melt and slag can be tapped and the process repeated.

The pellets 33 melt in the slag bath 29 (FIG. 1) and the non-volatile metals, such as chromium, iron, and manganese, melt and eventually flow downwardly into the melt 31. The melting process may be expedited by injecting the pellets 33 directly into the melt 31 through the insulated lance 32 as shown in FIG. 2. The melt 31 is more reactive with the pellets 33 and any slag materials, or volatile metals, vapor such as Zn and Pb, or off-gases rise to the slag surface and removed through the conduit 41.

The lower end of the lance 32 is disposed in the melt 31 and slightly above the bottom wall of the furnace 13. The upper end of the lance extends from a mixer 40 from where pellets from pellet machine 11 and off gas, entering from a gas injector 42, are injected downwardly through the lance 32. Thus, the pellet particles are pressurized on a gas stream of several pounds to penetrate the melt 31.

Upon leaving the furnace the off gases, laden with zinc, lead, and cadmium vapors are ducted to a non-ferrous metal condenser 15. Vapor condensation has been employed in the zinc industry for decades in "splash-type" units, in which a rotary impeller is employed to splash molten zinc and lead droplets onto which the metal vapors condense as they fall back into the bath. The liquid metals 43, 45 are virtually insoluble (less than 1%) and are gravity separated prior to casting into ingots. The condensation efficiency can be considerably improved by electromagnetic pumping 49 of the liquid metals to hydraulic spray nozzles 51 which can be used to provide a uniform curtain of droplets 53 for improved condensation surface. The off gas, a mixture of 75% carbon monoxide—25% hydrogen, will be vented from the condenser and may be used as fuel gas within the plant. The off gas has a heating value of approximately 325 BTU per cubic foot.

In conclusion, the advantages of the proposed process include:

(1) High efficiency due to elimination of the recycled gas and water-cooled electrode heating devices. The energy requirement is expected to drop from about 1900 kwhr per ton of dust to about 1300 kwhr per ton, (2) Cleanliness because the reactants are premixed and fed as pellets rather than loose dust, and the reactants will be contained within a liquid slag while the reduction reactions take place, (3) Process simplification and reduced capital cost resulting from elimination of the recycle gas system, plasma torches, expensive negative characteristic power supplies, coolant systems and much of the controls, and (4) Improved non-ferrous metal condensation due to the state of the art liquid metal pumping and spray nozzles.

What is claimed is:

1. A method for processing metallurgical waste from a ferrous metallurgical furnace comprising the steps of:
   (a) collecting metallurgical dust containing oxides of metals which when reduced, form volatile and non-volatile metals;
   (b) providing a reducing furnace containing a first metal bath and a reacting slag on the metal bath;
   (c) heating in the reducing slag a mixture of the metallurgical dust and a carbonaceous material which react to form a vapor of volatile metal and non-volatile elemental metal;
   (d) venting the volatile metal from the furnace; and
   (e) directing the volatile metal through an inlet into a condenser for condensing the volatile metal into a second liquid metal bath.

2. The method of claim 1 wherein the mixture of metallurgical dust and carbonaceous material is pelletized by compaction and without heating and fed into the reacting slag in the furnace.

3. The method of claim 2 wherein said mixture also includes sand and is pelletized and fed into the furnace where pellets penetrate the slag and are reduced to elemental metals with non-volatiles sinking into the metal bath and with the volatiles rising out of the reacting slag.

4. The method of claim 3 wherein non-volatile elemental metals collect in the first metal bath.

5. The method of claim 4 wherein the liquid metal is circulated from the second metal bath to a location proximate to the volatile metal inlet where the liquid metal is sprayed in the form of liquid metal droplets into the volatile metal to cause the volatile metal to condense on the liquid metal droplets.

6. The method of claim 5 wherein the volatile metal comprises vapors of elemental zinc and lead which form two immiscible layers of zinc and lead in the second metal bath.

7. The method of claim 6 in which the lead is circulated to the volatile metal inlet.

8. The metal of claim 7 in which a coolant coil is immersed in the lead layer to remove heat of vaporization in order to maintain the bath at a temperature slightly above the melting point of zinc.

9. A method of recovering lead and zinc from metallurgical waste from ferrous metallurgical furnace, comprising the steps of:
 (a) collecting metallurgical dust containing oxides of metals which when reduced, form volatile elemental metal;
 (b) compacting without heating a mixture of the dust, carbonaceous material, and silica into pellets;
 (c) providing a reducing furnace containing a metal bath and a reacting slag;
 (d) introducing the pellets into the reacting slag to reduce the dust into vapors of volatile metals and nonvolatile elemental metals with the nonvolatile elemental metal sinking from the slag into the metal bath;
 (e) venting the vapors of the volatile metals from the furnace;
 (f) directing the vapors through an inlet into a condenser for condensing the volatile metals into a liquid metal melt; and
 (g) circulating the liquid metal melt to a location near said inlet and above the melt and spraying droplets of said melt into the vapor of volatile metal to cause the volatile metal vapor to condense on the surfaces of the droplets.

10. The method of claim 9 in which the metallurgical dust also contains oxides of metals which when reduced form non-volatile elemental metals which in the furnace descend from the reacting slag to the liquid metal melts.

11. The method of claim 9 in which the liquid metal melt is comprised to separate layers of lead and zinc and in which the lead is circulated and sprayed as droplets into the condenser above the melt.

12. The method of claim 11 in which the pellets are introduced into the slag.

13. The method of claim 11 in which the pellets are introduced into the liquid metal melt.

* * * * *